United States Patent
Kim et al.

(10) Patent No.: US 11,045,839 B1
(45) Date of Patent: Jun. 29, 2021

(54) METHOD OF CONTROLLING CONVEYER AND ELECTRONIC APPARATUS THEREFOR

(71) Applicant: Coupang Corp., Seoul (KR)

(72) Inventors: Jae Hyun Kim, Seoul (KR); Gyung Seok Lee, Seoul (KR); Hyun Yop Jung, Seoul (KR); Woo Jung Park, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/016,255

(22) Filed: Sep. 9, 2020

(30) Foreign Application Priority Data

Feb. 5, 2020 (KR) ........................ 10-2020-0013949

(51) Int. Cl.
| | | |
|---|---|---|
| *B07C 3/18* | (2006.01) | |
| *B07C 3/00* | (2006.01) | |
| *G05B 19/418* | (2006.01) | |
| *B65G 67/02* | (2006.01) | |
| *G05B 19/4155* | (2006.01) | |
| *B65G 65/00* | (2006.01) | |
| *B65G 1/04* | (2006.01) | |

(Continued)

(52) U.S. Cl.
CPC ............... *B07C 3/00* (2013.01); *B07C 3/003* (2013.01); *B07C 3/10* (2013.01); *B07C 3/18* (2013.01); *B65G 1/04* (2013.01); *B65G 65/005* (2013.01); *B65G 67/02* (2013.01); *G05B 19/4155* (2013.01); *G05B 19/4189* (2013.01); *G06Q 50/28* (2013.01); *B65G 2203/0258* (2013.01); *B65G 2203/0283* (2013.01); *G05B 2219/45054* (2013.01)

(58) Field of Classification Search
CPC ...... G06Q 50/28; G05B 19/4155; B07C 3/00; B07C 3/003
See application file for complete search history.

(56) References Cited

U.S. PATENT DOCUMENTS 9,466,045 B1 * 10/2016 Kumar ................. G06Q 10/087
2008/0156618 A1 * 7/2008 Brain ................. H01L 21/67736
198/349.6

(Continued)

FOREIGN PATENT DOCUMENTS

CA 2333334 A1 8/2001
JP 2005-001832 A 1/2005

(Continued)

OTHER PUBLICATIONS

International Search Report dated Oct. 6, 2020, issued in corresponding PCT/KR2020/009487.

*Primary Examiner* — Thomas Randazzo
(74) *Attorney, Agent, or Firm* — Knobbe, Martens, Olson & Bear, LLP

(57) ABSTRACT

Provided is a method of controlling a conveyor for item transportation and an electronic apparatus therefor, the method including acquiring information associated with a plurality of destinations, identifying a weight for each of the plurality of destinations based on the acquired information, determining, in response to an item being identified, a destination among the plurality of destinations based on the identified weight, wherein the item is placed in the determined destination, and controlling the conveyor to transport the item to the determined destination.

18 Claims, 13 Drawing Sheets

(51) Int. Cl.
*G06Q 50/28* (2012.01)
*B07C 3/10* (2006.01)

(56) References Cited

U.S. PATENT DOCUMENTS

| | | | |
|---|---|---|---|
| 2013/0238783 A1* | 9/2013 | Alexander | G06F 16/954 |
| | | | 709/224 |
| 2018/0074477 A1* | 3/2018 | Burkhard | G05B 19/41865 |
| 2018/0094966 A1* | 4/2018 | Buether | B62D 53/068 |
| 2019/0352094 A1 | 11/2019 | Kamoshida et al. | |
| 2020/0065760 A1* | 2/2020 | Ayoub | G06F 16/90335 |
| 2020/0082711 A1* | 3/2020 | Bernet | G08G 1/0125 |
| 2020/0088531 A1* | 3/2020 | Kolambekar | G06Q 10/0631 |

FOREIGN PATENT DOCUMENTS

| | | | |
|---|---|---|---|
| JP | 2010-254433 A | 11/2010 | |
| JP | 2016-222455 A | 12/2016 | |
| JP | 2017-165502 A | 9/2017 | |
| JP | 2017-057028 A | 10/2017 | |
| KR | 10-2001-0078237 A | 8/2001 | |
| KR | 10-1907606 B1 | 10/2018 | |
| KR | 10-1974312 B1 | 4/2019 | |
| WO | WO 2018/061160 A1 | 4/2018 | |
| WO | WO-2019077658 A1 * | 4/2019 | G06Q 10/06 |
| WO | WO 2020/016929 A1 | 1/2020 | |

\* cited by examiner

FIG. 7

|  | Weight | Counter value |
|---|---|---|
| First destination | 3 | 3 |
| Second destination | 2 | 0 |
| Third destination | 1 | 0 |

FIG. 8

|  | Weight | Counter value |
|---|---|---|
| First destination | 3 | 1 |
| Second destination | 3 | 2 |
| Third destination | 1 | 0 |

METHOD OF CONTROLLING CONVEYER AND ELECTRONIC APPARATUS THEREFOR

BACKGROUND

Technical Field

This disclosure relates to a method for controlling a conveyor or conveyer for item transportation and an electronic apparatus therefor.

Description of the Related Art

A distribution center is a facility that stores products temporarily or for a long time for quick delivery of the products. With the revitalization of e-commerce, more distribution centers have been required, and there is an increasing desire for a plan for effective use of the distribution center.

Recently, in response to such desire, an automated system for a logistics process has been provided to the distribution center. The automated system may ensure that the products are evenly distributed in a plurality of destinations prepared to place the products in the distribution center.

Meanwhile, an administrator may manually distribute the products to differently distribute products for some of the plurality of destinations even while the automated system is used. In this case, a lot of time may be used for the placement of the products. Thus, a method to more efficiently distribute the products to the plurality of destinations may be required.

SUMMARY

Technical Goals

An aspect provides a method of controlling a conveyor to efficiently transport an item to each of a plurality of destinations prepared to place the item in a distribution center and an electronic apparatus therefor. Technical goals to be achieved by the present embodiments are not limited to the above-described technical tasks and may further include other technical tasks.

Technical Solutions

According to a first embodiment, there is provided a method of controlling a conveyor for item transportation, the method including acquiring information associated with a plurality of destinations, identifying a weight for each of the plurality of destinations based on the acquired information, determining, in response to an item being identified, a destination among the plurality of destinations based on the identified weight, wherein the item is placed in the determined destination, and controlling the conveyor to transport the item to the determined destination.

According to a second embodiment, there is also provided an electronic apparatus for controlling a conveyor for item transportation, the apparatus including a memory storing at least one instruction and a processor coupled to the memory, wherein the processor is configured to execute the at least one instruction to acquire information associated with a plurality of destinations, identify a weight for each of the plurality of destinations based on the acquired information, determine, in response to an item being identified, a destination among the plurality of destinations based on the identified weight, wherein the item is placed in the determined destination, and control the conveyor to transport the item to the determined destination.

According to a third embodiment, there is also provided a non-transitory computer-readable recording medium including a computer program for performing a method for controlling a conveyor for item transportation, the method including acquiring information associated with a plurality of destinations, identifying a weight for each of the plurality of destinations based on the acquired information, determining, in response to an item being identified, a destination among the plurality of destinations based on the identified weight, wherein the item is placed in the determined destination, and controlling the conveyor to transport the item to the determined destination.

Details of other embodiments are included in the detailed description and the accompanying drawings.

Effects

According to example embodiments, it is possible to provide a method of controlling a conveyor and an electronic apparatus therefor. The method of controlling the conveyor and the electronic apparatus therefor may transport an item to each of a plurality of destinations based on information associated with the plurality of destinations, so that a placement of the item is more efficiently performed. For example, the method of controlling the conveyor and the electronic apparatus therefor may transport an item to a destination based on a size of a placement space matching the destination, thereby more efficiently placing the item.

Further, according to example embodiments, it is possible to provide a method of controlling a conveyor and an electronic apparatus therefor. The method of controlling the conveyor and the electronic apparatus therefor may set different items transportations for the plurality of destinations, thereby effectively controlling the item transportations. For example, the method of controlling the conveyor and the electronic apparatus therefor may automatically control an item transportation for each of the plurality of destinations based on an input of a user, which may improve a user's convenience related to the item transportation.

Effects of the present disclosure are not limited to the effects mentioned above, and other effects not mentioned will become apparent to those skilled in the art from the description of the claims.

BRIEF DESCRIPTION OF THE DRAWINGS

FIGS. 7 and 8 are diagrams illustrating an operation of determining a destination in a method of controlling a conveyor according to an example embodiment.

FIG. 13 is a diagram illustrating a UI displayed to select a zone for an item transported by an electronic apparatus according to another example embodiment.

DETAILED DESCRIPTION

Terms used in embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element.

Throughout the specification, the expression "at least one of A, B, and C" may include the following meanings: A alone; B alone; C alone; both A and B together; both A and C together; both B and C together; and all three of A, B, and C together.

The term "terminal" mentioned below may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, embodiments of the present disclosure will be described in detail with reference to the drawings so that those skilled in the art can easily carry out the present disclosure. However, the present disclosure may be implemented in various different forms but it is not limited to the exemplary embodiments described herein.

Hereinafter, example embodiments of the present disclosure will be described with reference to the drawings.

Figure 1:
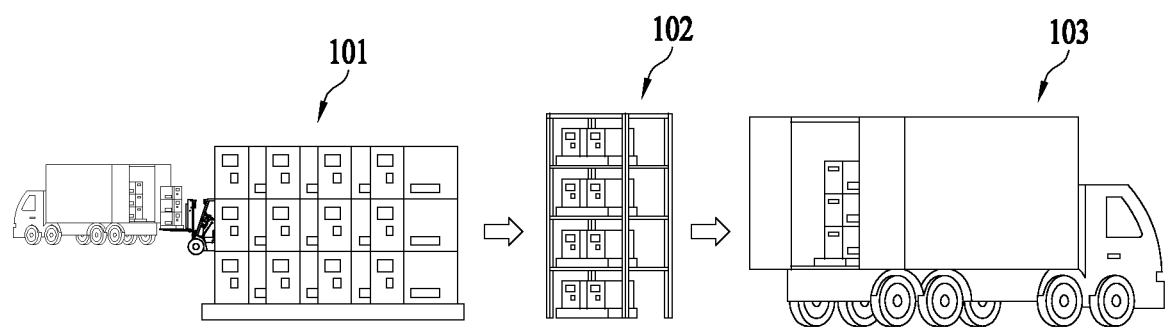
FIG. 1 is a schematic diagram illustrating a logistics process of a distribution center.

FIG. 1 is a schematic diagram illustrating a logistics process of a distribution center.

Referring to FIG. 1, a logistics process of a distribution center may include a reception operation 101, a placement operation 102, and a shipping operation 103. The reception operation 101 may include an operation in which an item to be disposed in the distribution center arrives at the distribution center. The placement operation 102 may include an operation in which the item is transported and placed in a placement space of the distribution center. The shipping operation 103 may include an operation in which an item to be shipped is taken out of the distribution center for delivery.

An electronic apparatus and a method of controlling a conveyor according to an example embodiment of the present disclosure may relate to a process from the reception operation 101 to the placement operation 102. Specifically, an electronic apparatus and a method of controlling a conveyor according to an example embodiment of the present disclosure may relate to a process from an operation or receiving an item to be disposed in a placement space of a distribution center to an operation of transporting the item to a predetermined destination for each placement space.

The logistics process of FIG. 1 is provided as a technical concept for explaining the present embodiment. Depending on an implementation of the logistics process, each operation (e.g., the reception operation 101, the placement operation 102, and the shipping operation 103) may also be referred to as another term, or another operation may be added before or after at least a portion of each operation.

In the present disclosure, the term "distribution center" may include a conveyor controlled by an electronic apparatus and indicate a specific space including a placement space for placing an item. However, embodiments of the present disclosure are not limited by such terminologies.

Figure 2:
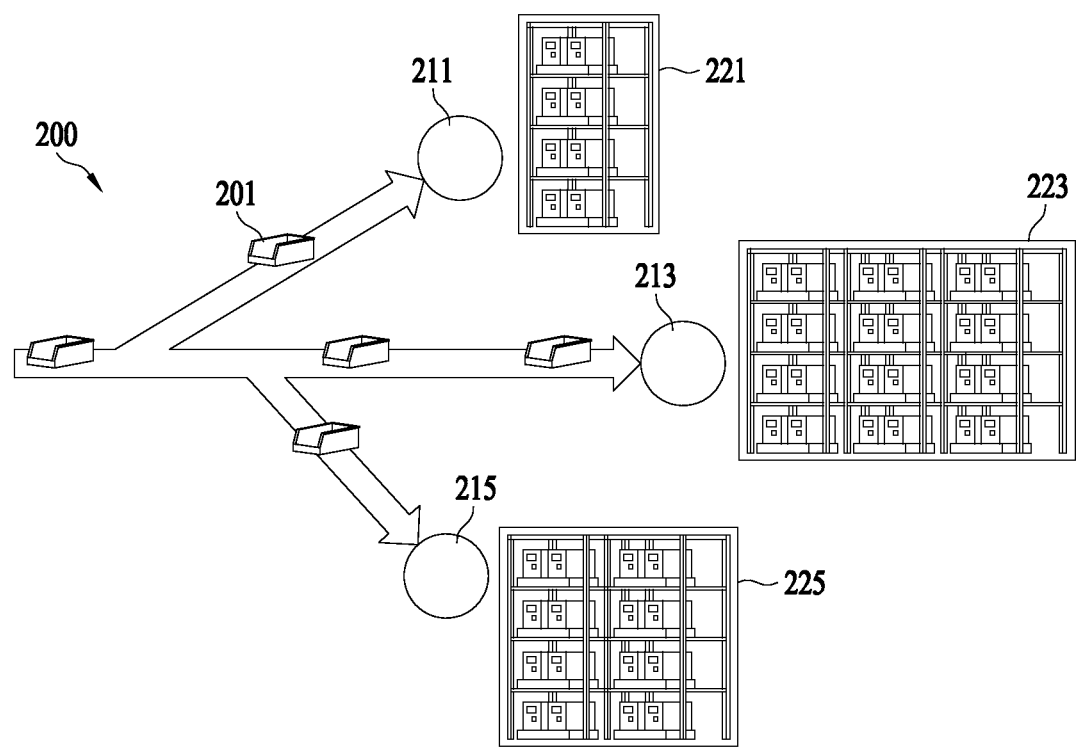
FIG. 2 is a diagram illustrating a method of controlling a conveyor according to an example embodiment.

FIG. 2 is a diagram illustrating a method of controlling a conveyor according to an example embodiment. Specifically, FIG. 2 schematically illustrates a flow of transporting an item to a destination (e.g., a first destination 211) corresponding to a placement space (e.g., a first placement space 221).

Referring to FIG. 2, a conveyor 200 may transport a plurality of items. For example, the conveyor 200 may include a conveyor belt. In this case, each of the plurality of items may be positioned on the conveyor belt and move based on a movement of the conveyor belt.

The conveyor 200 may be connected to a plurality of destinations (e.g., the first destination 211, a second destination 213, and a third destination 215) and transport an item to each of the plurality of destinations. In other words, each of a plurality of items may be transported to one of the plurality of destinations by the conveyor 200. For example, a first item 201 may be transported to the first destination 211 by the conveyor 200.

For each of the plurality of destinations, a placement space (e.g., the first placement space 221, a second placement space 223, and a third placement space 225) may be designated. In this case, an item transported to a destination may be placed in a placement space designated for the destination. For example, the first placement space 221 may be designated for the first destination 211. In this example, an item transported to the first destination 211 may be placed in the first placement space 221.

The item transported to the first destination 211 may be placed in the first placement space 221 by an electronic apparatus according to an example embodiment of the present disclosure. However, it is merely an example, and the item transported to the first destination 211 may be placed in the first placement space 221 by a user.

At least a portion of the placement spaces designated for the plurality of destinations may have different sizes. For example, a size of the first placement space 221 may be different from a size of the second placement space 223. In this example, more items may be placed in a larger placement space.

A destination and a placement space may have a distance there between. For example, the destination and the placement space may be spaced apart from each other by a predetermined distance. Distances between at least a portion of the plurality of destinations and placement spaces may be the same or different. However, the present example is not to be taken as being limited thereto. Also, in some cases, a destination and a placement space may be connected to each other.

An operator for managing items transported to destinations may be allocated to each of the plurality of destinations. A number of allocated operators may be determined in advance. For example, two operators may be allocated for the first destination 211 and three operators may be allocated for the second destination 213.

An electronic apparatus according to the present embodiment may control the conveyor 200 transporting an item to one of the plurality of destinations such that the item is placed in the placement space. Specifically, the electronic apparatus may acquire information associated with the plurality of destinations and determine a destination to which an item is to be transported among the plurality of destinations based on the acquired information. In response to the destination being determined, the electronic apparatus may control the conveyor 200 to transport the item to the determined destination.

An item to be transported by the conveyor 200 may be recognized by another electronic apparatus (e.g., a user terminal) connected to the electronic apparatus, and then transported by the conveyor 200. For example, the user terminal may recognize the item through a barcode included in the item and transmit information on or regarding the recognized item to the electronic apparatus. In this example, the electronic apparatus may receive the information on the item from the user terminal and determine a destination to which the item is to be transported, based on the information associated with the plurality of destinations in response to the information being received. When the destination is determined, the electronic apparatus may operate such that the item is transported to the determined destination.

As such, the electronic apparatus may control the conveyor 200 for respective items received in sequence. Through this, the item may be appropriately transported to one of the plurality of destinations based on the information associated with the plurality of destinations.

The distribution center may include a plurality of zones. At least one of the plurality of zones may be constituted as illustrated in FIG. 2. In this case, FIG. 2 may correspond to a schematic diagram illustrating one of the plurality of zones of the distribution center.

Figure 3:
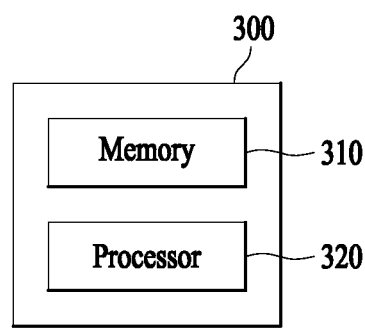
FIG. 3 is a block diagram illustrating an electronic apparatus according to an example embodiment.

FIG. 3 is a block diagram illustrating an electronic apparatus according to an example embodiment.

Referring to FIG. 3, an electronic apparatus 300 may include a memory 310 and a processor 320. Each of the memory 310 and the processor 320 may be a unit that processes at least one function or operation and may be implemented through hardware, software, or a combination of hardware and software.

The electronic apparatus 300 may be implemented as a server. In this case, the electronic apparatus 300 may be connected to another electronic apparatus, for example, a user terminal and perform data transmission and reception, thereby performing various operations.

FIG. 3 illustrates only components related to the present embodiment. However, it is apparent to those skilled in the art that other general-purpose components may be further included in addition to the components illustrated in FIG. 3.

The memory 310 may store a variety of data associated with the electronic apparatus 300. For example, the memory 310 may store at least one instruction for an operation of the processor 320 described later. However, this is merely an example, and the memory 310 may store data associated with numerous application programs (or applications) executed in the electronic apparatus 300.

The processor 320 may control an overall operation of the electronic apparatus 300 and process a signal and data associated with the electronic apparatus 300. The processor 320 may execute at least one instruction stored in the memory 310 and perform various operations described later.

The processor 320 may acquire information associated with a plurality of destinations. A destination may include a specific position located adjacent to a placement space to place an item in the placement space of a distribution center. For example, a placement space for placing an item may be allocated for each of the plurality of destinations, so that an item transported to the destination is placed in the placement space.

The information associated with the plurality of destinations may include information on or regarding at least one of a number of operators allocated for each of the plurality of destinations, a size of a placement space of each of the plurality of destinations, a distance between a destination and a placement space for each of the plurality of destinations, and a location of each of the plurality of destinations.

At least a portion of the information associated with the plurality of destinations may be input by a user, or previously designated and stored in the memory 310. For example, the number of operators allocated for each of the plurality of destinations, the size of the placement space of each of the plurality of destinations, and the distance between the destination and the placement space for each of the plurality of destinations may be input by the user. The location of each of the plurality of destinations may be stored in the memory 310 in advance.

When at least a portion of the information associated with the plurality of destinations is input from the user, the processor 320 may provide a user interface (UI) for input. A related example will be described with reference to FIG. 11.

The processor 320 may identify a weight for each of the plurality of destinations. Specifically, the processor 320 may identify the weight for each of the plurality of destinations based on the information associated with the plurality of destinations.

The processor 320 may identify the number of operators allocated for each of the plurality of destinations based on the information associated with the plurality of destinations. The processor 320 may determine the weight for each of the plurality of destinations in proportion to the number of operators.

For example, when two operators are allocated for a first destination and four operators are allocated for a second destination, a weight for the first destination may be determined to be "1" and a weight for the second destination may be determined to be "2." In this example, more items may be transported to a destination having more operators to increase an efficiency of item placement.

The processor 320 may identify the size of the placement space of each of the plurality of destinations based on the information associated with the plurality of destinations. The processor 320 may determine the weight for each of the plurality of destinations in proportion to the identified size of the placement space. The size of the placement space may include, for example, an area of the placement space, a volume of the placement space, or a number of cells included in the placement space (in a case in which the placement space includes a plurality of cells). The size of the placement space may be expressed based on a predetermined unit (e.g., square meters (m2), cubic meters (m3), and pieces). However, it is merely an example, and the size of the placement space may also be expressed by numbers (e.g., 1, 2) representing a size without using units.

For example, when the size of the placement space allocated to the first destination is 1 m2 and the size of the placement space allocated to the second destination is 2 m2, the weight for the first destination may be determined to be "1" and the weight for the second destination may be determined to be "2." In this example, more items may be transported to a destination having a larger placement space to increase the efficiency of item placement.

Items may be located in at least a portion of the placement space in advance. In this case, the size of the placement space may be represented as a size of an empty area of the placement space. The processor 320 may acquire information on or regarding the size of the empty area of the placement space based on a value acquired through a sensor disposed in the placement space. However, it is merely an example and the size of the empty area may be acquired in various ways, for example, through an input of a user.

The processor 320 may identify a distance from the placement space allocated for each of the plurality of destinations based on the information associated with the plurality of destinations. The processor 320 may determine a weight in inverse proportion to the identified distance.

For example, when a distance between the first destination and the first placement space allocated to the first destination is one meter (m) and a distance between the second destination and the second placement space allocated to the second destination is 3 m, the processor 320 may determine the weight of the first destination to be "3" and determine the weight of the second destination to be "1." The distance from the placement space may include, for example, a minimum distance from the placement space to the destination but is not limited thereto.

The processor 320 may identify the location of each of the plurality of destinations based on the information associated with the plurality of destinations. The processor 320 may determine the weight for each of the plurality of destinations based on a comparison between the identified location and a predetermined location. The predetermined location may include, for example, an item receiving location, an item shipping location, or a predetermined location in the distribution center (e.g., a predetermined position on a first floor of the distribution center). Here, the item receiving location may include a specific position at which an item is received in the distribution center. Also, the item shipping location may include a specific position at which an item is shipped from the distribution center.

A weight calculation scheme related to the predetermined location may be determined in advance. As an example, when the predetermined location includes the item receiving location, the processor 320 may determine the weight in inverse proportion to a distance between a location of the destination and the item receiving location. As another example, when the predetermined location includes the item shipping location, the processor 320 may determine the weight in proportion to a distance between a location of the destination and the item receiving location. As still another example, when the predetermined location includes the specific location in the distribution center, the processor 320 may determine the weight in proportion to a distance between a location of the destination and the specific location.

For example, when the distance between the first destination and the item receiving location is 5 m and the distance between the second destination and the item receiving location is 1 m, the processor 320 may determine the weight for the first destination to be "1" and determine the weight for the second destination to be "5."

The processor 320 may determine the weight by comprehensively considering at least a portion of the information associated with the plurality of destinations. For example, the processor 320 may determine the weight by comprehensively considering a weight for the number of operators allocated for each of the plurality of destinations and a weight for the size of the placement space of each of the plurality of destinations. Specifically, when the weight determined for the first destination based on the number of operators allocated for each of the plurality of destinations is "1", and when the weight determined for the first destination based on the size of the placement space of each of the plurality of destinations is "2", the processor 320 may aggregate the weights and determine a final weight for the first destination to be "3." However, a scheme for calculating the final weight is not limited to the foregoing examples and various methods, for example, a multiplication scheme may be applied thereto.

The weight may be determined based on an input of a user. Specifically, the processor 320 may receive an input of a user for setting the weight for each of the plurality of destinations. The processor 320 may determine the weight for each of the plurality of destinations based on the received input. In this case, the processor 320 may provide a UI to receive the input for setting the weight. A related example will be described with reference to FIG. 10.

The processor 320 may acquire information on an item. Based on at least one of the information associated with the plurality of destinations and the information on the item, the processor 320 may determine a destination related to the item among the plurality of destinations and identify a weight for the determined destination. Here, the information on the item may be information generated in response to the item being recognized through another electronic apparatus and may include information on, for example, at least one of a name of the item, a quantity, a size of the item, and a popularity of the item but is not limited thereto.

As an example, the processor 320 may identify a size of the item based on the information on the item. When the size of the item is a first size, the processor 320 may identify a destination related to a placement space including a space having at least the first size among the plurality of destinations and determine a weight for the identified placement space based on the information on the plurality of destinations.

As another example, the processor 320 may identify a value representing the popularity of the item based on the information on the item. A destination may be designated for each value representing the popularity of the item. In this case, the processor 320 may identify at least one destination designated based on the popularity. The processor 320 may determine a weight for the identified at least one destination based on the information on the plurality of destinations. Here, various methods described herein may be used to determine the weight.

The processor 320 may acquire the information on the item by receiving the information on the item from another electronic apparatus (e.g., a user terminal) connected to the electronic apparatus 300. In this case, the information on the item may be generated by the other electronic apparatus in response to the item being recognized in the other electronic apparatus. For example, the information on the item may be generated in response to the other electronic apparatus recognizing a barcode designated for the item but it is merely an example.

In response to the item being identified, the processor 320 may determine a destination for performing placement of the item among the plurality of destinations based on the identified weight. When an item to be transported by the conveyor is identified, the processor 320 may determine a destination for placing the item among the plurality of destinations based on the weight identified through the above-described operation.

For example, the processor 320 may determine a destination for performing an item placement among the plurality of destinations based on a weight identified based on a confirmation that an item to be transported by the conveyor is prepared. The confirmation may be performed through, for example, an input of a user or a recognition of a sensor included in the conveyor.

In response to the item being identified, the processor 320 may determine a destination having a highest weight among the plurality of destinations to be a destination for performing placement of the item. For example, when the weight of the first destination is "1" and the weight of the second destination is "2", the processor 320 may determine the second destination to be a destination to which the item is to be transported.

In some cases, the item identified by the processor 320 may correspond to a tote including at least one item. The tote may be an object in a form of a basket containing at least one item. In such cases, a placement for a placement space may be performed in units of the tote.

The processor 320 may determine a destination for performing placement of the item based on the weight and a counter value of each of the plurality of destinations. The counter value may be a value changing based on transportation of the item. Specifically, the counter value may be a value increasing in response to a confirmation that the item is transported to a destination corresponding to the counter value. For example, the counter value may be a value increasing in response to a destination to which the item is to be transported being determined.

Specifically, the processor 320 may determine a destination for performing placement of the item based on a result of comparison between weights of the plurality of destinations and a result of comparison between the weight and the counter value for each of the plurality of destinations.

For example, the processor 320 may determine a destination having a highest weight among destinations having weights greater than counter values among the plurality of destinations, to be a destination for performing placement of the item. In some cases, a counter value of the first destination having the highest weight among the plurality of destinations may be equal to the weight of the first destination. In such cases, the processor 320 may identify the second destination having a next highest weight after the first destination. When the weight of identified the second destination is greater than a counter value of the second destination, the processor 320 may determine the identified second destination to be a destination for performing placement of the item. A related example will be described with reference to FIGS. 7 and 8.

The processor 320 may change the weight of the determined destination to which the item is to be transported, in response to the item being transported. For example, when the first destination having the weight "3" is determined as the destination to which the item is to be transported, the processor 320 may change the weight of the first destination to "2" in response to the transportation of the item being started or completed. A change degree of the weight may be determined in advance and is not limited to the present example.

The distribution center may be divided into a plurality of zones in which a placement of an item is available. Each of the plurality of zones may include a plurality of destinations. In this case, the processor 320 may receive an input of selecting a zone from the plurality of zones. In response to the input being received, the processor 320 may identify a plurality of destinations included in the selected zone.

An input of selecting a zone may be applied to the electronic apparatus 300. For example, the electronic apparatus 300 may further include an input device to receive the input through the input device. In some cases, the electronic apparatus 300 may acquire information on an input of selecting a zone from another electronic apparatus and identify a plurality of destinations included in the selected zone based on the acquired information. Here, the other electronic apparatus may include, for example, a user terminal (or operator terminal) connected to the electronic apparatus 300 wired or wirelessly.

The processor 320 may control the conveyor to transport the item to the determined destination. Specifically, the processor 320 may generate a control signal and transmit the control signal to the conveyor, thereby controlling the conveyor to transport the item to the determined destination. Here, the conveyor may be a component included in the electronic apparatus 300 or connected to the electronic apparatus 300 to move the item to the destination. The conveyor may include, for example, a conveyor belt, a roller conveyor, a trolley conveyor, and a wheel conveyor but is not limited thereto. The conveyor may also be implemented as various components or devices that transport an item from one location to another location. For example, the conveyor may be a robot for transporting items.

Figure 4:
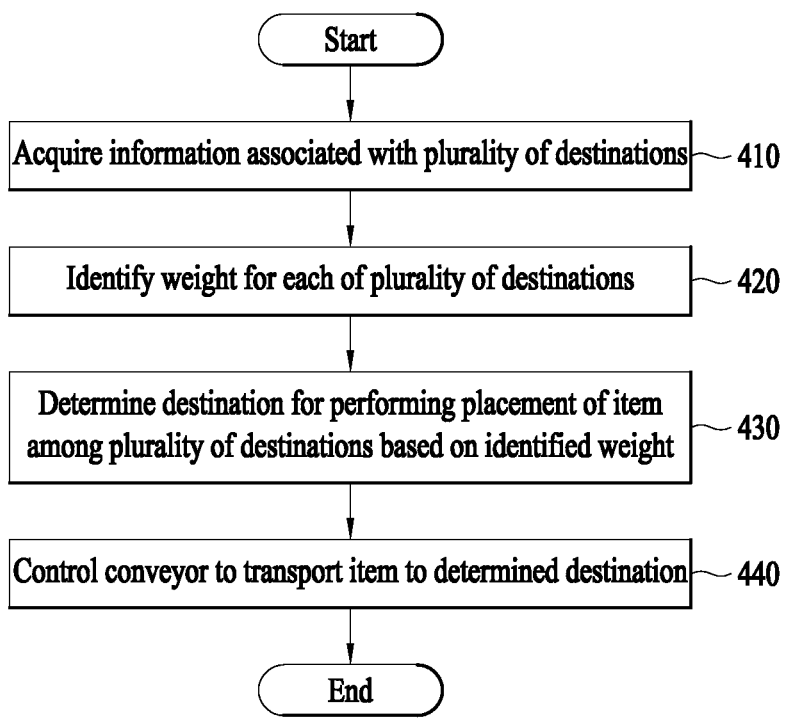
FIG. 4 is a flowchart illustrating a method of controlling a conveyor according to an example embodiment.

FIG. 4 is a flowchart illustrating a method of controlling a conveyor according to an example embodiment. Operations illustrated in FIG. 4 may be performed in different orders or irrespective of an order depending on cases. Hereinafter, redundant description which has been made above will be omitted.

Referring to FIG. 4, in operation 410, an electronic apparatus may acquire information associated with a plurality of destinations. The plurality of destinations may be locations to which an item is to be transported by a conveyor, and may be determined in advance. An item transported to a destination may be placed in a placement space related to the destination.

The information associated with the plurality of destinations may include information on at least one of a number of operators allocated for each of the plurality of destinations, a size of a placement space of each of the plurality of destinations, a distance between a destination and a placement space for each of the plurality of destinations, and a location of each of the plurality of destinations.

In operation 420, the electronic apparatus may identify a weight for each of the plurality of destinations based on the acquired information. The weight may be determined in advance or determined through an input of a user. In some cases, the weight may be determined based on the information associated with the plurality of destinations.

In an example, the electronic apparatus may identify the number of operators allocated for each of the plurality of destinations or the size of the placement space and determine the weight for each of the plurality of destinations in proportion to the identified number of operators or the identified size of the placement space.

In another example, the electronic apparatus may identify a distance from a placement space allocated to each of the plurality of destinations and determine the weight in inverse proportion to the identified distance.

In still another example, the electronic apparatus may identify a distance between the location of each of the plurality of destinations and a predetermined location and determine the weight for each of the plurality of destinations based on the identified distance. Here, the predetermined location may include, for example, the item receiving location or the item shipping location.

The electronic apparatus may acquire information on or regarding the item. The electronic apparatus may determine a destination related to the item among the plurality of destinations based on at least one of the information associated with the plurality of destinations and the information on the item and identify a weight for the determined destination. Here, the information on the item may be information generated in response to the item being recognized through another electronic apparatus and may include information on, for example, at least one of a name of the item, a quantity, a size of the item, and a popularity of the item but is not limited thereto.

As an example, the electronic apparatus may identify a size of the item based on the information on or regarding the item. When the size of the item is a first size, the electronic apparatus may identify a destination related to a placement space including a space having at least the first size among the plurality of destinations and determine a weight for the identified placement space based on the information on the plurality of destinations.

As another example, the electronic apparatus may identify a value representing the popularity of the item based on the information on or regarding the item. A destination may be designated for each value representing the popularity of the item. In this case, the electronic apparatus may identify at least one destination designated based on the popularity. The electronic apparatus may determine a weight for the identified at least one destination based on the information on the plurality of destinations. Here, various methods described herein may be used to determine the weight.

In operation 430, the electronic apparatus may determine a destination for performing placement of the item among the plurality of destinations based on the identified weight. The electronic apparatus may determine a destination for performing placement of the item based on at least one of a weight and a counter value of each of the plurality of destinations.

The electronic apparatus may determine a destination for performing placement of the item based on a result of comparison between weights of the plurality of destinations and a result of comparison between the weight and the counter value for each of the plurality of destinations.

As an example, the electronic apparatus may determine a destination having a highest weight among the plurality of destinations to be a destination for performing placement of the item.

As another example, the electronic apparatus may determine a destination having a highest weight among destinations having weights greater than counter values among the plurality of destinations, to be a destination for performing placement of the item. In some cases, a counter value of the first destination having the highest weight among the plurality of destinations may be equal to the weight of the first destination. In such cases, the processor 320 may identify the second destination having a next highest weight after the first destination. When the weight of identified the second destination is greater than a counter value of the second destination, the electronic apparatus may determine the identified second destination to be a destination for performing placement of the item.

In operation 440, the electronic apparatus may control the conveyor to transport the item to the determined destination. The electronic apparatus may control the conveyor to transport the item to a destination determined among the plurality of destinations based on a transmission of a control signal. For example, the electronic apparatus may generate a control signal for transporting the item to the determined destination and transmit the control signal to the conveyor, thereby controlling the conveyor.

Figure 5:
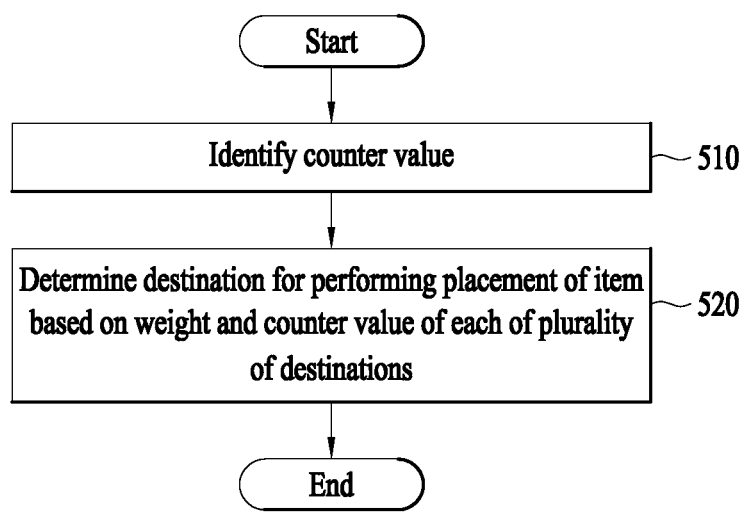
FIG. 5 is a flowchart illustrating a method of controlling a conveyor according to another example embodiment.

FIG. 5 is a flowchart illustrating a method of controlling a conveyor according to another example embodiment. Specifically, FIG. 5 illustrates an example of operation 430 of FIG. 4.

Referring to FIG. 5, in operation 510, an electronic apparatus may identify a counter value. The electronic apparatus may identify a counter value of each of a plurality of destinations. Here, the counter value may be set for each destination and may be a value changing based on transportation of the item. For example, the counter value may be a value increasing in response to a confirmation that an item is transported to a destination.

In operation 520, the electronic apparatus may determine a destination for performing placement of an item based on a weight and a counter value of each of the plurality of destinations.

The electronic apparatus may determine a destination for performing placement of the item based on a result of comparison between weights of the plurality of destinations and a result of comparison between the weight and the counter value for each of the plurality of destinations.

For example, based on a result of comparison between weights of the plurality of destinations and a result of comparison between the weight and the counter value for each of the plurality of destinations, the electronic apparatus may determine a destination having a highest weight among destinations having weights greater than counter values among the plurality of destinations, to be a destination for performing placement of the item.

Figure 6:
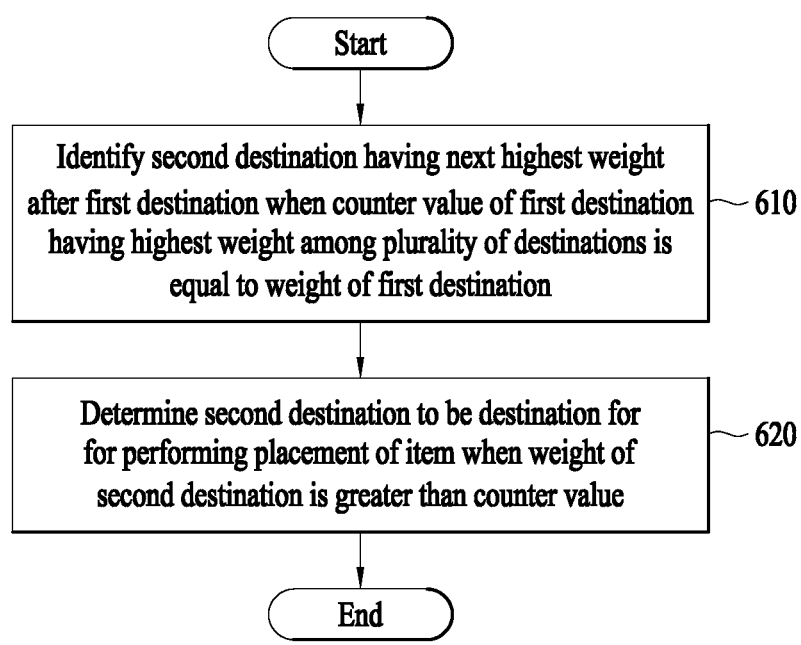
FIG. 6 is a flowchart illustrating a method of controlling a conveyor according to still another example embodiment.

FIG. 6 is a flowchart illustrating a method of controlling a conveyor according to still another example embodiment. Specifically, FIG. 6 illustrates an example of operation 520 of FIG. 5.

Referring to FIG. 6, in operation 610, when a counter value of a first destination having a highest weight among a plurality of destinations is equal to the weight of the first destination, an electronic apparatus may identify a second destination having a next highest weight after the first destination.

Specifically, the electronic apparatus may identify the first destination having the highest weight among the plurality of destinations based on identification of a weight and a counter value of each of the plurality of destinations. The electronic apparatus may identify whether the weight of the first destination is equal to the counter value of the first destination. If the weight of the first destination is equal to the counter value, the electronic apparatus may identify the second destination having the next highest weight after the first destination.

The electronic apparatus may identify whether the counter value of the first destination having the highest weight among the plurality of destinations corresponds to the weight of the first destination. A counter value corresponding to each weight may be determined in advance. For example, a weight "1" may correspond to a counter value "2" and a weight "2" may correspond to a counter value "4." When the counter value of the first destination corresponds to the weight of the first destination, the electronic apparatus may identify the second destination having the next highest weight after the first destination.

In operation 620, when the weight of the second destination is greater than a counter value, the electronic apparatus may determine the second destination to be a destination for performing placement of the item. Specifically, the electronic apparatus may identify whether the weight of the second destination is greater than the counter value in response to the second destination being identified. When the weight of the second destination is greater than the counter value, the electronic apparatus may determine the second destination to be a destination for performing placement of the item.

When the weight of the second destination is greater than a weight corresponding to the counter value, the electronic apparatus may determine the second destination to be a destination for performing placement of the item. For example, when the counter value of the second destination is "2" and a weight corresponding to the counter value "2" is "1", the electronic apparatus may determine the second destination to be a destination for performing placement of the item in response to the weight of the second destination being greater than "1."

FIGS. 7 and 8 are diagrams illustrating an operation of determining a destination in a method of controlling a conveyor according to an example embodiment.

Referring to FIG. 7, a plurality of destinations according to an example embodiment of the present disclosure may include a first destination, a second destination, and a third destination. A weight of the first destination is "3." A weight of the second destination is "2." A weight of the third destination is "1." A counter value of the first destination is "3." A counter value of each of the second destination and the third destination is zero.

The electronic apparatus may identify the first destination having a highest weight and compare the weight of the first destination and the counter value. In the example of FIG. 7, the weight of the first destination may correspond to the counter value. In this case, the electronic apparatus may identify a destination having a next highest weight after the first destination. For example, the electronic apparatus may identify the second destination that is a destination having a next highest weight after the first destination.

In response to the second destination being identified, the electronic apparatus may identify whether the weight of the second destination is greater than the counter value. As illustrated, since the weight of the second destination is greater than the counter value, the electronic apparatus may determine the second destination to be a destination to which an item is to be moved.

Referring to FIG. 8, a weight of a first destination is "3", a weight of a second destination is "3", and a weight of a third destination is "1." A counter value of the first destination is "1." A counter value of the second destination is "2." A counter value of the third destination is zero.

As illustrated in FIG. 8, a plurality of destinations may have a highest weight. For example, the electronic apparatus may identify the first destination and the second destination having the highest weight. In this example, the electronic apparatus may identify a destination having a weight greater than a counter value from the first destination and the second destination and determine the identified destination to be a destination to which an item is to be transported.

As an example, the electronic apparatus may compare the weight of the first destination to the counter value and compare the weight of the second destination to the counter value. Each of the first destination and the second destination may have the weight greater than the counter value. In this case, the electronic apparatus may determine a destination having a greater difference between a weight and a counter value to be a destination to which an item is to be transported. In this example, a difference between the weight and the counter value of the first destination may be greater than a difference between the weight and the counter value of the second destination. Thus, the electronic apparatus may determine the first destination to be a destination to which an item is to be transported.

As another example, the electronic apparatus may determine a destination having a less difference between a weight and a counter value to be a destination to which an item is to be transported. The difference between the weight and the counter value of the second destination may be less than the difference between the weight and the counter value of the first destination. Thus, the electronic apparatus may determine the second destination to be a destination to which an item is to be transported.

Figure 9:
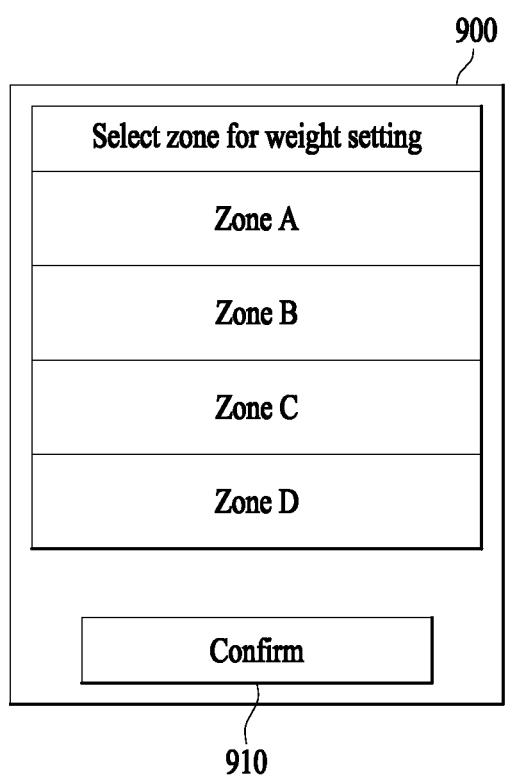
FIGS. 9 and 10 are diagrams illustrating a user interface (UI) displayed for weight setting in an electronic apparatus according to an example embodiment.
Figure 10:
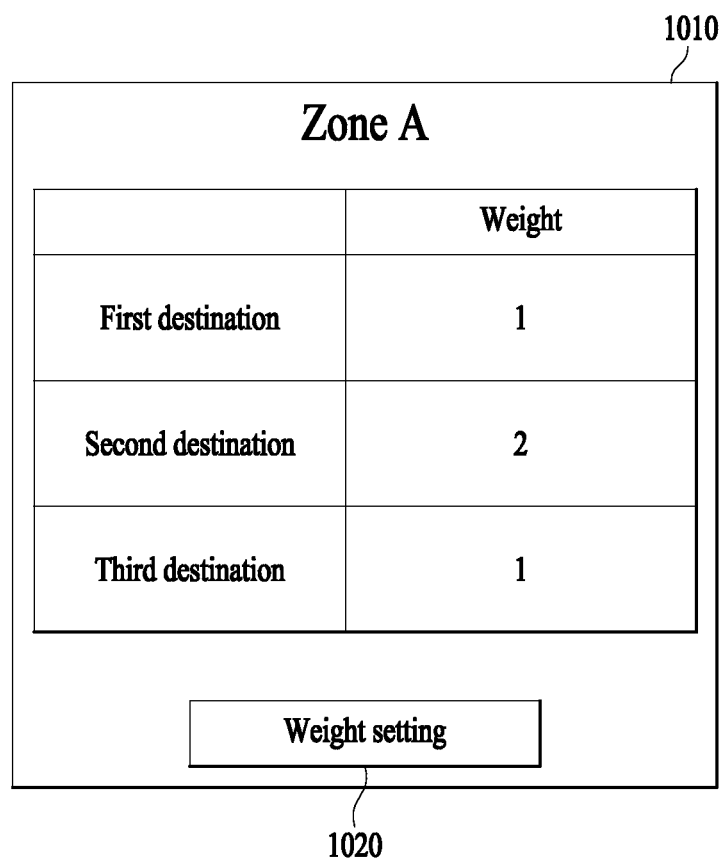

FIGS. 9 and 10 are diagrams a UI displayed for weight setting in an electronic apparatus according to an example embodiment.

Specifically, FIGS. 9 and 10 illustrate examples of a UI provided to acquire an input of a user when weight setting is performed based on the input of the user. The UI of FIGS. 9 and 10 may be displayed directly on an electronic apparatus, and may also be displayed on another electronic apparatus, for example, a user terminal, connected to the electronic apparatus wired or wirelessly.

Referring to FIG. 9, the electronic apparatus may acquire an input of selecting a zone for setting a weight from a user through a first screen 900. Here, the zone may include a plurality of destinations according to an example embodiment of the present disclosure and may be a predetermined zone in a distribution center.

For example, the electronic apparatus may acquire an input of selecting one of a zone A, a zone B, a zone C, and a zone D. The input may include a touch input to a display displaying the first screen 900 but is not limited thereto. When an input to a confirmation button 910 included in the first screen 900 is received, the electronic apparatus may provide a second screen 1010 to set a weight for the selected zone as shown in FIG. 10.

FIG. 10 illustrates an example of a screen displayed when a zone A is selected as a zone for which a weight is to be set. Referring to FIG. 10, information on the zone for which the weight is to be set, for example, a name of the zone may be displayed in an upper portion of the second screen 1010.

The second screen 1010 may be a settings screen for weight setting of each destination. The electronic apparatus may receive an input of a number corresponding to a weight appear on the second screen 1010, for example, numbers corresponding to "1, 2, and 1" as shown in FIG. 10. The input of the number may include, for example, a text input corresponding to the number.

When an input of a number corresponding to the weight for each destination is received, and when an input to a weight setting button 1020 is received, the electronic apparatus may set the number corresponding to the weight for each destination to be the weight.

In some cases, a distribution center may be provided as a single zone. In such cases, provision of the first screen 900 of FIG. 9 will be omitted.

Figure 11:
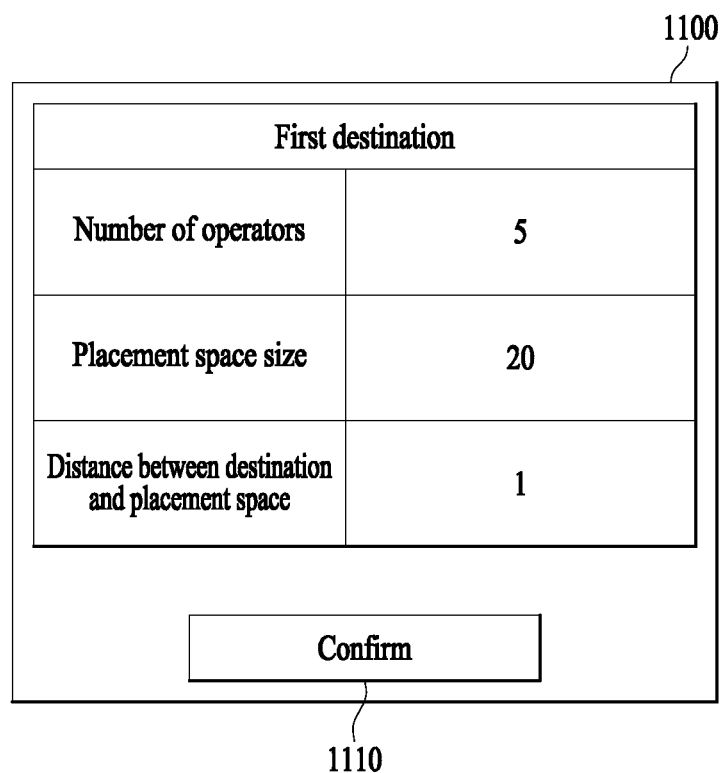
FIG. 11 is a diagram illustrating a UI displayed to acquire information associated with a destination in an electronic apparatus according to an example embodiment.

FIG. 11 is a diagram illustrating a UI displayed to acquire information associated with a destination in an electronic apparatus according to an example embodiment.

Specifically, FIG. 11 illustrates an example of a UI provided to acquire information associated with a first destination among a plurality of destinations when a weight is determined based on information associated with a destination and the information associated with the destination is acquired based on an input of a user. The UI of FIG. 11 may be displayed directly on the electronic apparatus, and may also be displayed on another electronic apparatus, for example, a user terminal, connected to the electronic apparatus wired or wirelessly.

Referring to FIG. 11, the information associated with the first destination (e.g., a number of operators, a size of a placement space, and a distance between a destination and a placement space) may be acquired through a third screen 1100. For example, the information associated with the first destination may be acquired based on numbers input in cells corresponding to the number of operators, the size of the placement space, and the distance between the destination and the placement space on the third screen 1100.

For example, as shown in the third screen 1100, when values corresponding to the number of operators, the size of the placement space, and the distance between the destination and the placement space are input, and when an input to a confirmation button 1110 is received, the number of operators may be determined to be 5, the size of the placement space may be determined to be 20 m2, and the distance between the destination and the placement space may be determined to be 1 m. Here, a unit for each number may be determined in advance.

Although not shown, a screen like the third screen 1100 may be provided for each of the plurality of destinations. Information associated with the plurality of destinations may be acquired based on an input to the provided screen. However, it is merely an example, and at least a portion of the information associated with the plurality of destinations (e.g., the size of the placement space) may be stored in a memory of the electronic apparatus in advance.

Figure 12:
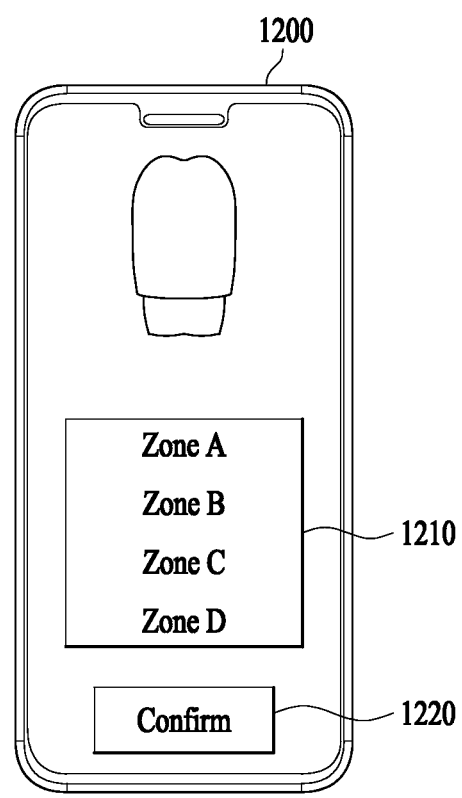
FIG. 12 is a diagram illustrating a UI displayed on another electronic apparatus to select a zone for an item transported by an electronic apparatus according to an example embodiment.

FIG. 12 is a diagram illustrating a UI displayed on another electronic apparatus to select a zone of an item transported by an electronic apparatus according to an example embodiment. Specifically, FIG. 12 illustrates an example of a UI provided to a user terminal 1200 connected to an electronic apparatus to select a zone in which a received item is to be placed.

Referring to FIG. 12, the user terminal 1200 may display information on a received item (e.g., a picture of the item) and zone information 1210 on a zone (e.g., a zone A, a zone B, a zone C, and a zone D) in which a placement of the item is available. Such information may be displayed on a display of the user terminal 1200 in response to the item being recognized through the user terminal 1200.

The user terminal 1200 may receive an input of selecting a zone from the zone information 1210. The user terminal 1200 may transmit information on the zone selected from the zone information 1210 by the input to the electronic apparatus based on an input to a confirmation button 1220. The electronic apparatus may determine a destination to which an item is to be transported in the corresponding zone based on the transmitted information such that the item is transported to the determined destination. Since the transportation of the item has been described above, redundant description will be omitted.

The UI of FIG. 12 may be displayed directly on the electronic apparatus. In this case, an input of selecting a zone and an input to the confirmation button 1220 may be received through an input to the electronic apparatus.

Figure 13:
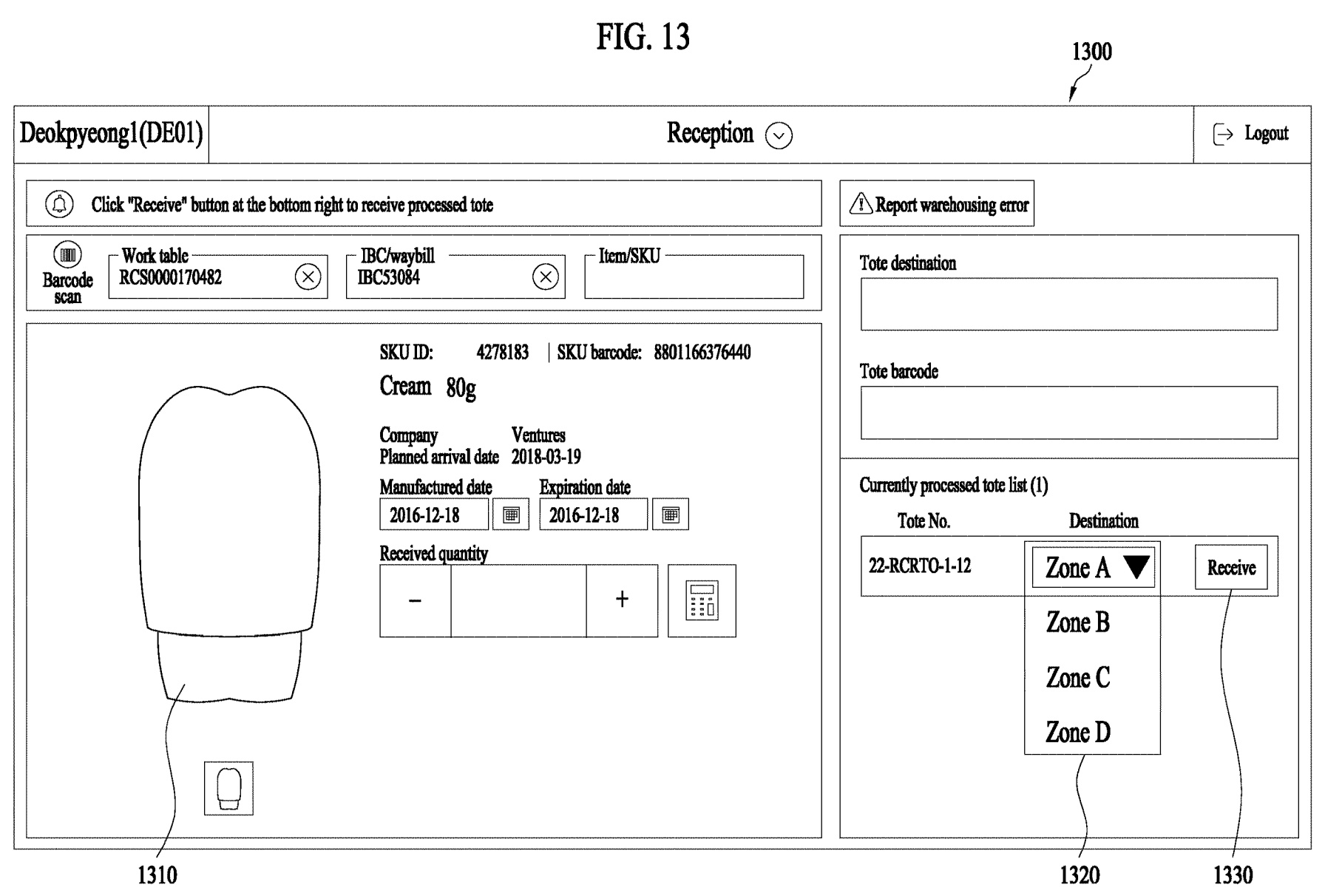

FIG. 13 is a diagram illustrating a UI displayed to select a zone of an item transported in an electronic apparatus according to another example embodiment.

Referring to FIG. 13, a fourth screen 1300 may contain various information associated with an item 1310 to be placed. For example, various information associated with the item 1310 may include information on or regarding a picture, a size, a popularity, a manufactured date, an expiration date, and a name of the item but is not limited thereto. Also, the various information associated with the item 1310 may include various information shown in FIG. 13 and other various displayable information.

The fourth screen 1300 may include a selecting field 1320 for selecting a zone in which the item 1310 is to be placed. When a zone is selected from a plurality of zones (e.g., a zone A, a zone B, a zone C, and a zone D) displayed in the selecting field 1320, and when an input to a reception button 1330 is received, the electronic apparatus may determine a destination for placing the item 1310 in the selected zone so that the item 1310 is transported to the determined destination.

The fourth screen 1300 may be displayed on a display included in the electronic apparatus, but not be limited thereto. In some cases, the fourth screen 1300 may be displayed on another electronic apparatus (e.g., a user terminal) connected to the electronic apparatus as illustrated in FIG. 12. In such cases, a zone selection may be performed in response to an item to be placed being scanned based on an input of a user of the other electronic apparatus. The electronic apparatus may acquire information on or regarding a selected zone from the other electronic apparatus and transport the item based on the acquired information.

According to the present disclosure, a method of controlling a conveyor and an electronic apparatus therefor may transport an item to each of a plurality of destinations based on information associated with the plurality of destinations so that a placement of the item is more efficiently performed. For example, the method of controlling the conveyor and the electronic apparatus therefor may transport an item to a destination based on a size of a placement space matching the destination, thereby more efficiently placing the item.

In addition, the method of controlling the conveyor and the electronic apparatus therefor may set different items transportations for the plurality of destinations, thereby effectively controlling the item transportations. For example, the method of controlling the conveyor and the electronic apparatus therefor may automatically control an item transportation for each of the plurality of destinations based on an input of a user, which may improve a user's convenience related to the item transportation.

The apparatus described herein may include a permanent storage such as a disk drive, a communication port for handling communications with external devices, and user interface devices such as a touch panel, a key, and a button. The methods that are implemented as software modules or algorithms may be stored as program instructions or computer-readable codes executable by the processor on a computer-readable recording medium. Here, examples of the computer-readable recording medium include magnetic storage media (e.g., read only memory (ROM), random access memory (RAM), floppy disk, or hard disk), optically readable media (e.g., compact disk-read only memory (CD-ROM) or digital versatile disk (DVD)), etc. The computer-readable recording medium may be distributed over network coupled computer systems, and thus, the computer-readable code may be stored and executed in a distributed fashion. This medium may be read by the computer, stored in the memory, and executed by the processor.

The present embodiments may be described in terms of functional block components and various processing steps. Such functional blocks may be realized by any number of hardware and/or software components configured to perform specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The terms "mechanism," "element," "means," and "configuration" are used broadly and are not limited to mechanical or physical embodiments. These terms may include meaning of a series of routines of software in association with a processor, for example.

The above-described embodiments are merely examples, and other embodiments may be implemented within the scope of the following claims.

What is claimed is:

1. A method of controlling a conveyor for item transportation, wherein the conveyor is configured to transport a plurality of items to a plurality of destinations, the method comprising:
   providing, by an electronic apparatus, a user interface to acquire information associated with the plurality of destinations;
   acquiring, via the user interface of the electronic apparatus, the information associated with the plurality of destinations;
   identifying, by the electronic apparatus, a weight for each of the plurality of destinations based on the information associated with the plurality of destinations;
   determining, by the electronic apparatus, in response to an item being identified, a destination for the item among the plurality of destinations based on the weight for each of the plurality of destinations;
   based on determining the destination for the item, generating, by the electronic apparatus, a control signal for transporting the item to the destination; and
   transmitting, by the electronic apparatus, the control signal to the conveyor, wherein the control signal causes the conveyor to transport the item to the destination.

2. The method of claim 1, wherein a placement space for placing the item is allocated to each of the plurality of destinations, and
   wherein the information associated with the plurality of destinations comprises one or more of:
   a number of operators allocated to each of the plurality of destinations,
   a size of a particular placement space of each of the plurality of destinations,
   a distance between a particular destination and the particular placement space for each of the plurality of destinations, or
   a location of each of the plurality of destinations.

3. The method of claim 1, wherein identifying the weight comprises:
   identifying a number of operators allocated to each of the plurality of destinations based on the information associated with the plurality of destinations; and
   determining the weight for each of the plurality of destinations based on the number of operators allocated to each of the plurality of destinations.

4. The method of claim 1, wherein identifying the weight comprises:
   identifying a size of a placement space of each of the plurality of destinations based on the information associated with the plurality of destinations; and
   determining the weight for each of the plurality of destinations based on the size of the placement space.

5. The method of claim 1, wherein identifying the weight comprises:
   identifying a location of each of the plurality of destinations based on the information associated with the plurality of destinations; and
   determining the weight for each of the plurality of destinations based on a distance between the location and a reception location of the item or a distance between the location and a shipping location of the item.

6. The method of claim 1, wherein a placement space for placing the item is allocated to each of the plurality of destinations, and
   wherein identifying the weight comprises:
   identifying a distance from the placement space for each of the plurality of destinations based on the information associated with the plurality of destinations; and
   determining the weight in inverse proportion to the distance.

7. The method of claim 1, wherein determining the destination comprises:
   determining the destination having a highest weight among the plurality of destinations to be the destination to receive the item.

8. The method of claim 1, wherein a first weight for the destination is changed in response to the item being transported to the destination.

9. The method of claim 1, further comprising:
   receiving an input, the input comprising a selection of a zone from a plurality of zones in which placement of the item is available; and
   identifying, in response to receiving the input, the plurality of destinations included in the zone.

10. The method of claim 1, wherein the item comprises a plurality of sub-items, wherein the plurality of sub-items comprises a first subset of the plurality of sub-items associated with a first item type and a second subset of the plurality of sub-items associated with a second item type.

11. The method of claim 1, further comprising:
    acquiring information regarding the item,
    wherein identifying a particular weight for a particular destination of the plurality of destinations comprises:
    determining the particular destination is related to the item based on one or more of the information associated with the plurality of destinations or the information regarding the item, and
identifying the particular weight for the particular destination.

12. The method of claim 11, wherein the information regarding the item comprises information regarding a size of the item, and
wherein determining the particular destination is related to the item comprises determining the particular destination comprises a placement space larger than the size of the item.

13. The method of claim 1, wherein determining the destination comprises determining, based on a counter value and the weight for each of the plurality of destinations, the destination to receive the item, and
wherein a particular counter value for a particular destination increases in response to a confirmation that a particular item is transported to the particular destination.

14. The method of claim 13, wherein determining the destination comprises determining the destination to receive the item, based on a result of comparison between weights for each of the plurality of destinations and a result of comparison between the weight and the counter value for each of the plurality of destinations.

15. The method of claim 13, wherein determining the destination comprises determining the destination is related to a highest weight among a subset of the plurality of destinations, wherein the subset of the plurality of destinations have weights greater than counter values.

16. The method of claim 13, wherein determining the destination comprises:
determining a first destination of the plurality of destinations based on a first weight for the first destination;
determining a first counter value for the first destination is equal to the first weight for the first destination;
identifying a second destination based on a second weight for the second destination; and
determining the second destination to be the destination based on the second weight for the second destination exceeding a second counter value for the second destination.

17. An electronic apparatus for controlling a conveyor for item transportation, wherein the conveyor is configured to transport a plurality of items to a plurality of destinations, the electronic apparatus comprising:
a memory storing at least one instruction; and
a hardware processor coupled to the memory, wherein the hardware processor is configured to execute the at least one instruction to:
provide a user interface to acquire information associated with the plurality of destinations;
acquire, via the user interface of the electronic apparatus, the information associated with the plurality of destinations;
identify a weight for each of the plurality of destinations based on the information associated with the plurality of destinations;
determine, in response to an item being identified, a destination for the item among the plurality of destinations based on the weight for each of the plurality of destinations;
based on determining the destination, generate a control signal for transporting the item to the destination; and
transmit the control signal to the conveyor, wherein the control signal causes the conveyor to transport the item to the destination.

18. A non-transitory computer-readable recording medium comprising a computer program for performing a method for controlling a conveyor for item transportation, wherein the conveyor is configured to transport a plurality of items to a plurality of destinations, the method comprising:
providing, by an electronic apparatus, a user interface to acquire information associated with the plurality of destinations;
acquiring, via the user interface of the electronic apparatus, the information associated with the plurality of destinations;
identifying, by the electronic apparatus, a weight for each of the plurality of destinations based on the information associated with the plurality of destinations;
determining, by the electronic apparatus, in response to an item being identified, a destination for the item among the plurality of destinations based on the weight for each of the plurality of destinations;
based on determining the destination, generating, by the electronic apparatus, a control signal for transporting the item to the destination; and
transmitting, by the electronic apparatus, the control signal to the conveyor, wherein the control signal causes the conveyor to transport the item to the destination.

\* \* \* \* \*